US011001507B2

(12) United States Patent
Lee

(10) Patent No.: US 11,001,507 B2
(45) Date of Patent: May 11, 2021

(54) METHOD OF RECOVERING IRON FROM ZINC SULPHATE SOLUTION

(71) Applicant: KOREA ZINC CO., LTD., Seoul (KR)

(72) Inventor: Je Joong Lee, Seoul (KR)

(73) Assignee: KOREA ZINC CO., LTD., Seoul (KR)

( * ) Notice: Subject to any disclaimer, the term of this patent is extended or adjusted under 35 U.S.C. 154(b) by 0 days.

(21) Appl. No.: 16/287,829

(22) Filed: Feb. 27, 2019

(65) Prior Publication Data

US 2019/0233302 A1 Aug. 1, 2019

Related U.S. Application Data

(63) Continuation of application No. PCT/KR2018/001452, filed on Feb. 2, 2018.

(30) Foreign Application Priority Data

Feb. 1, 2018 (KR) ........................ 10-2018-0012953

(51) Int. Cl.
*C01G 49/06* (2006.01)
*C22B 3/08* (2006.01)
(Continued)

(52) U.S. Cl.
CPC ................ *C01G 49/06* (2013.01); *C01G 9/06* (2013.01); *C21B 15/00* (2013.01); *C22B 3/08* (2013.01);
(Continued)

(58) Field of Classification Search
CPC .......... C01G 49/06; C01G 9/06; C21B 15/00; C22B 3/08; C22B 3/22; C22B 3/44; C22B 19/22; C22B 19/26
(Continued)

(56) References Cited

U.S. PATENT DOCUMENTS 3,976,743 A * 8/1976 Landucci ................ C22B 19/22
423/101
4,252,622 A 2/1981 Freeman et al.
(Continued)

FOREIGN PATENT DOCUMENTS

AU 2015415628 6/2017
CN 1602365 3/2005
(Continued)

OTHER PUBLICATIONS

Ozberk et al., "Commercial operations of the Sheriritt zinc pressure leach process", Hydrometallurgy, vol. 39, 1995, 13 pages.
(Continued)

*Primary Examiner* — Melissa S Swain
(74) *Attorney, Agent, or Firm* — Hamre, Schumann, Mueller & Larson, P.C.

(57) ABSTRACT

A method of recovering iron from a zinc sulfate solution according to an embodiment of the present disclosure is associated with recovering iron from a zinc sulfate solution produced by a leaching process in which zinc ore is dissolved in sulfuric acid. The method comprises a conditioning process including a step of reducing a conditioning process input solution, which is the zinc sulfate solution, and an iron precipitation process for recovering iron as hematite, including a step of pressurizing and oxidizing an iron precipitation process input solution discharged from the conditioning process. The iron precipitation process is performed at a temperature ranging from 135° C. to 150° C. and a pressure ranging from 5 barg to 10 barg.

11 Claims, 3 Drawing Sheets

(51) Int. Cl.
    *C22B 3/00*         (2006.01)
    *C22B 3/22*         (2006.01)
    *C21B 15/00*       (2006.01)
    *C01G 9/06*         (2006.01)
    *C22B 3/44*         (2006.01)

(52) U.S. Cl.
    CPC ............... *C22B 3/22* (2013.01); *C22B 3/44* (2013.01); *C22B 19/22* (2013.01); *C22B 19/26* (2013.01); *C01P 2002/72* (2013.01); *Y02P 10/20* (2015.11)

(58) Field of Classification Search
    USPC .......................................................... 423/141
    See application file for complete search history.

(56) References Cited

U.S. PATENT DOCUMENTS

| | | | |
|---|---|---|---|
| 4,440,569 A | | 4/1984 | Weir et al. |
| 5,336,297 A | * | 8/1994 | McElroy ............... C22B 3/0005 423/100 |
| 5,380,354 A | * | 1/1995 | Chalkley ............... C22B 3/08 423/109 |
| 6,039,790 A | | 3/2000 | Hultholm et al. |
| 7,294,319 B2 | | 11/2007 | Lahtinen et al. |
| 2013/0192424 A1 | * | 8/2013 | Salminen ............... C22B 3/46 75/743 |
| 2014/0212348 A1 | * | 7/2014 | Tamargo Garcia ..... C22B 19/02 423/104 |
| 2015/0044112 A1 | * | 2/2015 | Matsubara ............... C22B 3/02 423/150.1 |
| 2015/0145186 A1 | * | 5/2015 | Olson, III ............ B01D 67/0046 266/227 |

FOREIGN PATENT DOCUMENTS

| | | | |
|---|---|---|---|
| CN | 103526024 A | | 1/2014 |
| CN | 103643036 A | * | 3/2014 |
| CN | 103911512 A | | 7/2014 |
| CN | 104039992 A | | 9/2014 |
| CN | 106868295 | | 6/2017 |
| CN | 106868304 | | 6/2017 |
| CN | 106868306 | | 6/2017 |
| EA | 005959 B1 | | 8/2005 |
| EP | 1453985 A1 | | 9/2004 |
| EP | 1664358 B1 | | 11/2010 |
| JP | 08-512092 | | 12/1996 |
| JP | 08512092 | | 12/1996 |
| JP | 11-510857 | | 9/1999 |
| JP | 3197288 | | 8/2001 |
| JP | 2005041711 A | | 2/2005 |
| JP | 2017-137578 A | | 8/2017 |
| KR | 10-1999-0084258 | | 12/1999 |
| KR | 10-2003-0043957 | | 6/2003 |
| KR | 10-2004-0054821 | | 6/2004 |
| KR | 10-2010-0108746 | | 10/2010 |
| RU | 2117057 C1 | | 8/1998 |
| RU | 2588218 C2 | | 4/2015 |
| UA | 17161 A | | 3/1997 |
| WO | 1994025632 A1 | | 11/1994 |
| WO | 2002/20855 | | 3/2002 |
| WO | 2003/056042 | | 7/2003 |
| WO | 2013105453 A1 | | 7/2013 |
| WO | 2017/090784 | | 6/2017 |

OTHER PUBLICATIONS

Korean Office Action, issued in the corresponding Korean application No. 10-2018-0012953, dated Mar. 11, 2018, 17 pages.
Korean Notice of Allowance, issued in the corresponding Korean application No. 10-2018-0012953, dated May 17, 2018, 3 pages.

* cited by examiner

METHOD OF RECOVERING IRON FROM ZINC SULPHATE SOLUTION

CROSS-REFERENCE TO RELATED APPLICATION

This application is a Continuation Application of PCT International Application No. PCT/KR2018/001452, filed on Feb. 2, 2018, which claimed the benefit of Korean Patent Application No. 10-2018-0012953, filed on Feb. 1, 2018, the entire content of each of which is hereby incorporated by reference.

TECHNICAL FIELD

The present disclosure relates to a method of recovering ferrous sulfate ($FeSO_4$) contained in a zinc sulfate solution as ferric oxide ($Fe_2O_3$) in the form of hematite.

BACKGROUND

A zinc process generally includes a roasting process of oxidizing a sulfide-form concentrate (ZnS), a leaching process of dissolving a calcine (ZnO) produced in the roasting process in a sulfuric acid solution, and a process of electrowinning a pure zinc sulfate solution produced through a multi-stage purification process for impurities and depositing zinc on a cathode. In the leaching process, various metal components such as iron (Fe), copper (Cu), nickel (Ni), cobalt (Co), and cadmium (Cd) contained in a zinc concentrate are leached together. In particular, most zinc sulfide concentrates are in the form of sphalerite and have high iron content. In the leaching process, sulfuric acid remaining in a zinc sulfate solution (free sulfuric acid) is neutralized using a calcine or the like as a neutralizing agent.

Various disclosures have been proposed in order to remove iron from a zinc sulfate neutralization solution containing a large amount of iron ions. In U.S. Pat. No. 4,440,569, a calcine obtained by roasting a zinc concentrate is leached under high-temperature and strong-acid leaching conditions, and subjected to solid-liquid separation, and then an acid remaining in the leached solution is neutralized through a reduction process and a neutralization process. Iron is removed in the form of goethite by hydrolysis from a zinc sulfate solution that has been subjected to the neutralization process using a calcine.

In a general zinc process, the iron ions dissolved in the zinc sulfate solution are removed by being precipitated in the form of goethite, jarosite, or hematite.

It is described, in U.S. Pat. No. 7,294,319, that when iron is precipitated and separated from a zinc sulfate solution, the iron content is 40 to 45% in goethite and 30 to 35% in jarosite, whereas the iron content of hematite is as high as 50 to 60%, and the zinc content is 2 to 3% in goethite, 3 to 5% in jarosite, and 0.5 to 1% in hematite. However, the iron (Fe) content in the cake-form iron precipitate generated in a general zinc process is 22 to 27% for jarosite, 30 to 40% for goethite, 50 to 60% for hematite, and thus is produced as cake including lower iron contents than those represented in U.S. Pat. No. 7,294,319 or the like, except for hematite.

Therefore, the most efficient method for removing iron dissolved in the zinc sulfate solution in the zinc process may be to remove the iron in the form of hematite, which yields the least amount of cake per ton of iron and entails the lowest loss of valuable metal.

However, the process of preparing goethite and jarosite is generally carried out under atmospheric pressure, while the process of manufacturing hematite requires high-temperature, high-pressure reaction conditions.

The Ruhr-Zink Zinc refinery in Germany has performed a process of removing iron in the form of hematite at a temperature of 180-200° C. and a pressure of 18 barg using a zinc sulfate solution having a zinc concentration of 140 g/l (E. Ozberk, etc., Hydrometallurgy, 39, 1995).

However, the solubility of zinc sulfate is as high as about 180 g/l at room temperature, but is lowered to about 105 g/l at 180° C. and about 85 g/l at 200° C., so that supersaturated zinc is precipitated as salt of zinc sulfate monohydrate ($ZnSO_4H_2O$), which adheres to the inner portion of an apparatus and which frequently leads to failure of the apparatus.

In Japanese Patent Publication No. 3,197,288, a reaction was performed for 2 hours under the conditions of a temperature of 200° C. and an oxygen partial pressure of 18 barg using a process solution containing 25 g/l of iron and having a zinc concentration of 100 g/l or less, and thus hematite containing 52% iron was precipitated and separated. However, as the zinc sulfate concentration in the process solution is lowered, the scale of an apparatus required for producing a given amount of zinc is increased, and the apparatus operation and investment costs are increased. Thus, economic efficiency is lowered.

As shown in the aforementioned patents, since the process of precipitating and removing iron contained in the zinc sulfate solution in the form of hematite in the related art is performed under high-temperature and high-pressure conditions, a lot of energy is consumed. Since the solubility of zinc sulfate is low under the above conditions and the zinc concentration of the process solution is maintained at or below a predetermined concentration, apparatuses such as reactors and pumps are increased in the zinc process and higher temperature resistance and pressure resistance are required for the apparatuses. Thus, investment and operating costs are high, the processing speed is reduced due to frequent apparatus failure, and repair costs are increased, and thus economic efficiency is very low.

In order to carry out a reaction under high-temperature and high-pressure conditions, an autoclave apparatus set to a considerably high pressure, an apparatus for supplying a process solution supplied to the autoclave at a very high pressure, and auxiliary apparatuses such as a decompression apparatus for discharging the reacted process solution from the autoclave are required. Because these high-pressure apparatuses are set to a high pressure, the apparatuses are expensive and frequently fail, which is economically very disadvantageous.

SUMMARY

An aspect of the present disclosure is to provide a method of recovering iron from a zinc sulfate solution, in which an amount of produced cake can be reduced and hematite having a high valuable metal recovery rate can be produced when recovering iron contained in the zinc sulfate solution.

Further, another aspect of the present disclosure is to provide a method for recovering iron from a zinc sulfate solution, in which the method can be carried out under the conditions of a temperature and pressure lower than the temperature and pressure in the related art and the quality of hematite can be improved when recovering iron contained in the zinc sulfate solution.

A method of recovering iron from a zinc sulfate solution according to an embodiment of the present disclosure is associated with recovering iron from a zinc sulfate solution produced by a leaching process in which zinc ore is dissolved in sulfuric acid.

The method comprises a conditioning process including a step of reducing a conditioning process input solution, which is the zinc sulfate solution, and an iron precipitation process for recovering iron as hematite, including a step of pressurizing and oxidizing an iron precipitation process input solution discharged from the conditioning process. The iron precipitation process is performed at a temperature ranging from 135° C. to 150° C. and a pressure ranging from 5 barg to 10 barg.

A method of recovering iron from a zinc sulfate solution according to an embodiment of the present disclosure is associated with recovering iron from a zinc sulfate solution produced by a leaching process in which zinc ore is dissolved in sulfuric acid.

The method comprises a conditioning process including a step of reducing a conditioning process input solution, which is the zinc sulfate solution, and an iron precipitation process for recovering iron as hematite, including a step of pressurizing and oxidizing an iron precipitation process input solution discharged from the conditioning process. The iron precipitation process input solution has oxidation-reduction potential of −100 mV or less when a silver/silver chloride (Ag/AgCl) electrode is used as a reference electrode.

A reducing agent may be input in the step of reducing the conditioning process input solution, and the oxidation-reduction potential may be adjusted using the reducing agent.

The reducing agent may include zinc powder.

A post-conditioning process solution may be produced in the step of reducing the conditioning process input solution, and the post-conditioning process solution may be treated using a thickener and a filter, so that the discharged solution may be used as the iron precipitation process input solution and solid matter may be discharged as conditioning cake.

A post-iron precipitation process solution is produced in the step of pressurizing and oxidizing the iron precipitation process input solution, and the post-iron precipitation process solution may be treated in a thickener and a filter, so that a discharged solution may be transferred to a neutralization process and solid matter may be discharged as iron oxide.

The iron precipitation process input solution may have a pH ranging from 3 to 5.5.

The iron precipitation process input solution may have a zinc concentration ranging from 120 g/l to 150 g/l.

The iron precipitation process input solution may have an iron concentration ranging from 5 g/l to 20 g/l.

A processing time of the iron precipitation process may range from 30 minutes to 3 hours.

Oxygen and steam may be input in the step of pressurizing and oxidizing the iron precipitation process input solution.

An autoclave may be used in the step of pressurizing and oxidizing the iron precipitation process input solution.

The step of pressurizing and oxidizing the iron precipitation process input solution is performed in an autoclave apparatus, and the autoclave apparatus may include an autoclave, a flash vessel to which a process solution is supplied from the autoclave, a heater configured to heat the process solution using steam generated from the flash vessel, and a heat exchanger configured to perform heat exchange using steam until a final reaction temperature of the process solution is reached.

The flash vessel may be provided in plural number.

DETAILED DESCRIPTION

In the general zinc process, iron (Fe) and copper (Cu) are also leached together with sulfuric acid in the process of leaching a zinc raw material into the sulfuric acid, and iron in the Fe (III) state contained in a leaching solution is reduced to Fe (II) using a reducing agent such as zinc concentrate. The sulfuric acid remaining in the reducing solution is neutralized to a more neutral pH range using a neutralizing agent such as a calcine, and is then subjected to solid-liquid separation to obtain a neutralized zinc sulfate solution.

A considerable amount of Fe (II) is dissolved in the neutralized zinc sulfate solution, and is fed to a de-ironing process so as to remove iron.

Copper contained in a de-ironing process solution is separated by solid-liquid separation, and then a reducing agent is added thereto so as to reduce and precipitate copper (Cu) dissolved in the form of copper sulfate ($CuSO_4$) as copper (Cu) cement, which is metallic copper powder, thereby removing the copper. However, in the above-mentioned de-ironing process, the components such as Cu (II) contained in the process solution act as catalysts for rapidly oxidizing Fe (II) to Fe (III) in the precipitation reaction of iron to facilitate the production of jarosite. Thus, higher temperatures and higher pressures were required to precipitate iron from the zinc sulfate solution in the form of hematite.

The present disclosure aims to lower the reaction temperature and pressure of an iron precipitation process to a level lower than those of the related art. In order to lower the reaction temperature and pressure, it is necessary to condition a neutralized zinc sulfate solution so as to remove catalyst components. In addition, when even a trace amount of Fe (III) is present in the solution, it is necessary to completely reduce Fe (III) to Fe (II) in the zinc sulfate solution to be input to the iron precipitation process.

Figure 1:
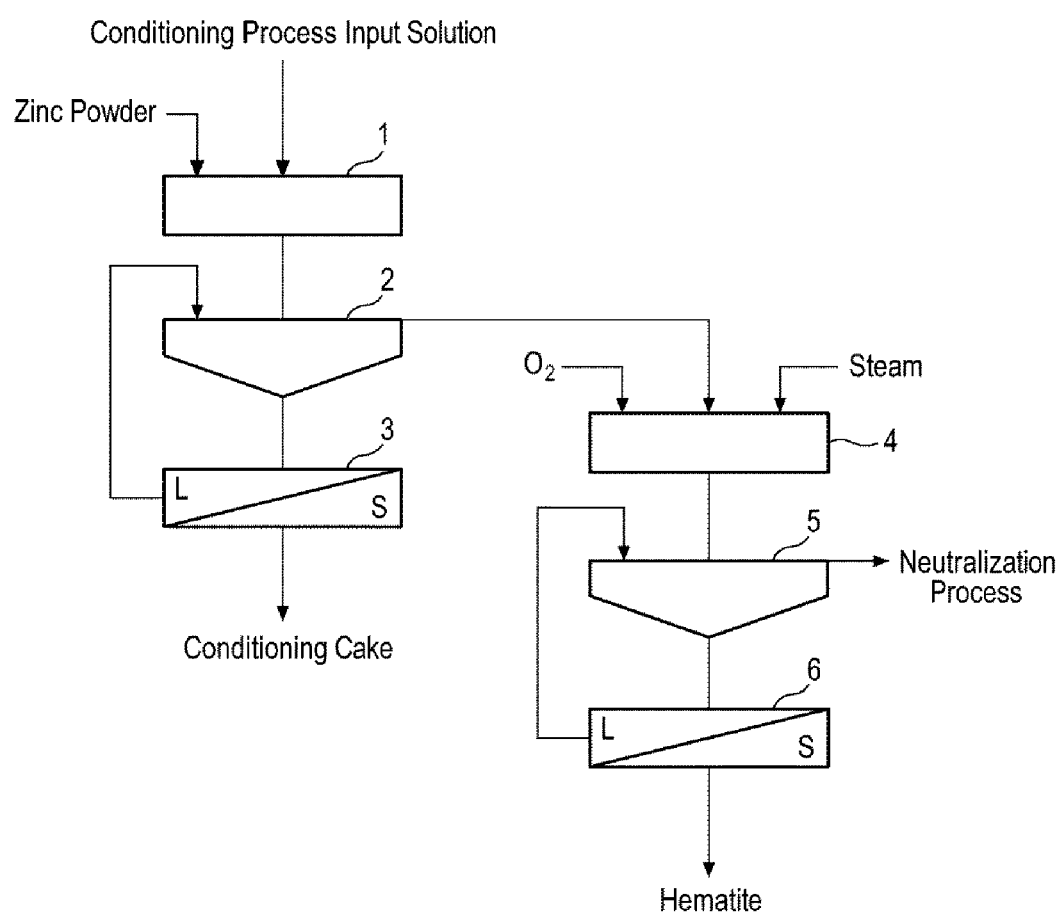
FIG. 1 is a process flowchart for recovering iron as hematite according to an embodiment of the present disclosure.

FIG. 1 is a process flowchart for recovering iron as hematite according to an embodiment of the present disclosure.

In the zinc process, a zinc sulfate solution is prepared by leaching raw materials containing zinc, such as a zinc concentrate, a calcine obtained by roasting the zinc concentrate, or zinc ferrite, into sulfuric acid at atmospheric pressure. The sulfuric acid remaining in the leaching process is first neutralized using a calcine so as to remove impurities therefrom. The iron components leached therewith in the process of leaching the raw material are not precipitated in the neutralization process, and thus the iron components remain in the process solution after neutralization.

Referring to FIG. 1, the zinc sulfate solution is input to a conditioning process as a conditioning process input solution. In the conditioning process, the conditioning process input solution is input to a conditioning bath 1, and is discharged as conditioning cake in a filter 3 via a thickener 2, and the post-conditioning process solution is transferred to the iron precipitation process so as to be input as an iron precipitation process input solution.

In the iron precipitation process, the iron precipitation process input solution is input to the iron precipitation bath 4, the solid portion is prepared as hematite via the thickener 5 and the filter 6, and the solution is transferred to the neutralization process as a post-iron precipitation process solution.

In the present disclosure, catalyst components such as copper are removed using a reducing agent in the neutralized conditioning process input solution in order to recover iron as hematite at a lower temperature and lower pressure than those in the conventional technique, and the conditioning process is applied in order to reduce Fe (III) contained in a trace amount into Fe (II).

The conditioning process includes a reducing step performed by inputting a reducing agent, and the Oxidation-Reduction Potential (ORP) of the post-conditioning process solution is adjusted by varying the type and input amount of the reducing agent. In addition, the reducing agent is input to the conditioning bath 1 to which the conditioning process input solution is input.

The post-conditioning process solution is the iron precipitation process input solution of the iron precipitation process, which is the subsequent process.

In the present disclosure, the oxidation-reduction potential of the iron precipitation process input solution is adjusted to −100 mV or less. More specifically, the oxidation-reduction potential is adjusted to −400 mV or less. When the oxidation-reduction potential is higher than −100 mV, some jarosite is mixed therewith, and thus the iron content of the iron precipitation cake may be lowered to less than 50%. When the oxidation-reduction potential is higher than −100 mV, higher-temperature and higher-pressure conditions are required in order to produce hematite.

On the other hand, when the oxidation-reduction potential is −100 mV or lower, the reducing atmosphere is very dominant, and hematite may be produced at a lower temperature and a lower pressure compared to the case in which the oxidation and reduction potential is higher than −100 mV. In this case, the iron content in the iron precipitate may be 50% or more.

When the oxidation-reduction potential is −400 mV or lower, more excellent hematite is produced at a relatively low temperature and low pressure.

In order to further lower the oxidation-reduction potential, the input amount of the reducing agent may be increased, so that the oxidation-reduction potential can be controlled in consideration of economic efficiency.

The pH of the iron precipitation process input solution is adjusted to about 3 to 5.5.

When the pH of the iron precipitation process input solution is less than 3, the sulfuric acid contained in the conditioning process input solution reacts with the reducing agent, thereby increasing the amount of the reducing agent that is used. When the pH exceeds 5.5, zinc precipitates in the form of zinc sulfate salt (nZn(OH)$_2$.mZnSO$_4$), resulting in loss of zinc in the process solution, and the precipitated zinc salt may become a cause of lowering an apparatus operation rate by adhering to the apparatus in the iron precipitation process.

The input amount of the reducing agent may be varied depending on the composition of the conditioning process input solution, such as the concentrations of Fe (III) and copper (Cu) contained in the conditioning process input solution. The input amount of the reducing agent may be determined depending on the Oxidation-Reduction Potential (ORP) value.

As the reducing agent, an inorganic reducing agent, such as zinc powder or aluminum, or an organic reducing agent may be used. The zinc powder is good as a reducing agent because of its excellent reducing power. When zinc concentrate having weak reducing power is used as a reducing agent, unlike in the present disclosure, the ORP value is lowered only to about 200 mV and cannot be adjusted to 0 mV or lower.

The components such as copper contained in the conditioning process input solution are precipitated in the form of copper cement having a high copper content in the conditioning process and are discharged as conditioning cake. Therefore, after the conditioning process input solution is subjected to solid-liquid separation, copper can be recovered in a copper recovery process. According to the present disclosure, copper cement can be obtained as a byproduct in a conditioning process, which is a pretreatment step of an iron precipitation process.

A post-conditioning process solution produced through this process is transferred to the iron precipitation process in order to produce the iron contained therein in the form of hematite.

The iron precipitation process includes a pressurizing and oxidizing step in which oxygen and steam are input.

The zinc concentration in the iron precipitation process input solution is adjusted to about 120 g/l to 150 g/l. When the concentration of zinc in the iron precipitation process input solution exceeds about 150 g/l, the salt of Zinc Sulfate Monohydrate (ZSM) may be produced at a temperature ranging from about 135° C. to 150° C., which is a temperature condition of the iron precipitation process in the present disclosure. When the concentration of zinc in the iron precipitation process solution is less than about 120 g/l, the scale of an apparatus for producing the same amount of zinc must be increased, which is not desirable because apparatus operation and apparatus investment costs are also increased.

The iron concentration of the iron precipitation process input solution is adjusted to about 5 g/l to 20 g/l. Although there is no problem with regard to the production and quality of hematite even at a low iron concentration, when the iron concentration in the iron precipitation process input solution is less than about 5 g/l, the process is not economical in terms of operation efficiency. When the iron concentration of the post-conditioning process solution exceeds 20 g/l, the acid concentration in the process solution after the iron precipitation reaction is increased and thus the iron precipitation rate is decreased. Therefore, as the jarosite is produced, the iron content in the iron precipitate may be lowered.

The step of performing pressurization and oxidization at a high temperature and a high pressure in the iron precipitation step may be carried out using an autoclave.

In the present disclosure, even though the zinc sulfate solution having a high zinc concentration ranging from about 120 g/l to 150 g/l in the process solution is used in the iron precipitation step using the autoclave, iron is recovered as hematite at a temperature ranging from about 135° C. to 150° C. and at a pressure ranging from about 5 barg to 10 barg, which are lower than the temperature and pressure in the related art. In one preferred embodiment, an autoclave process time for iron recovery is about 30 minutes to 3 hours.

When the pressure inside the autoclave is less than 5 barg, the oxygen partial pressure inside the autoclave is lowered to 2 barg or less and the iron removal rate is decreased. Meanwhile, when the pressure inside the autoclave exceeds 10 barg, it is necessary to increase the pressure of the oxygen and zinc solution to be supplied to the autoclave to 13 barg or higher, which is higher than the pressure inside the autoclave, which may increase apparatus investment costs.

When the temperature inside the autoclave is less than about 135° C., the jarosite starts to be produced as an iron precipitate, and the iron content in the iron precipitate may be lowered to less than 50%. When the temperature inside the autoclave is higher than 150° C., there is no influence on the production of hematite. However, supersaturated zinc in the process solution is precipitated as zinc sulfate monohydrate, thereby increasing the zinc content of the iron precipitate and decreasing the relative iron content. In addition, the zinc sulfate monohydrate may adhere to the inner wall of the autoclave or to a pipe in the form of salt, which may cause problems in apparatuses. Considering the decrease in the zinc recovery rate due to the precipitation of zinc sulfate monohydrate, it is appropriate for the temperature range inside the autoclave to be from about 135° C. to 150° C.

In addition, at a temperature of about 60° C. or higher, the solubility of zinc sulfate decreases as the temperature increases. In the related art, the temperature range for producing hematite is about 180° C. or higher, but according to the present disclosure, hematite can be produced at a temperature ranging from about 135° C. to 150° C.

Therefore, according to the present disclosure, it is possible to increase the zinc concentration in the process input solution by performing the process of recovering iron as hematite at a temperature lower than that in the related art. By keeping the zinc concentration higher than in the related art, it is possible to reduce the scale of zinc production apparatuses and to reduce operating costs by facilitating the apparatus operation.

Moreover, the hematite produced in the iron precipitation process may be separated from the zinc sulfate solution through the thickener 5 and the filter 6, and may not be input to the iron precipitation process as seeds.

Therefore, the present disclosure overcomes problems such as deteriorated operating efficiency and an increased apparatus wear rate due to the increase in solid particles in the process solution, which may be caused when produced hematite is input again to the iron precipitation process as seeds.

Hereinafter, the content of embodiments according to the present disclosure will be described in detail.

Example 1

In Example 1, using a zinc sulfate solution, which was prepared by adjusting ORP by varying the input amount of zinc powder into each neutralized conditioning process input solution, that is, a zinc sulfate leaching solution, the iron precipitation reaction efficiency depending on the ORP value was observed at reaction conditions of 140° C. and 7 barg within an autoclave. When zinc powder is input, the ORP of the zinc sulfate solution is further lowered and Fe (II) becomes more stable in this process. The iron precipitation reaction in Example 1 was carried out without inputting hematite seeds.

The iron precipitation reaction efficiency was observed using a zinc sulfate solution, the ORP of which was adjusted to fall within the range from +200 mV to −400 mV (vs. Ag/AgCl) when a silver/silver chloride (Ag/AgCl) electrode was used as a reference electrode, under reaction conditions of 140° C. and 7 barg. The ORP in the conditioning process was adjusted by varying the input amount of zinc powder, and the iron content in the iron precipitate was quantitatively analyzed using an ICP-AES spectroscopy.

TABLE 1

|  | Comparative Example 1 | Comparative Example 2 | Inventive Example 1 | Inventive Example 2 | Inventive Example 3 |
|---|---|---|---|---|---|
| ORP (mV) | +200 | 0 | −100 | −200 | −400 |
| Iron in precipitate (%) | 35.3 | 45.4 | 52.1 | 55.9 | 56.6 |
| Precipitation of Jarosite | O | Δ | X | X | X |

Table 1 shows iron precipitation behavior depending on the ORP value according to Example 1.

Referring to Table 1, in the case of a zinc sulfate solution that was not subjected to a conditioning process (Comparative Example 1), the iron precipitate was precipitated as yellowish jarosite, and the iron content was very low, that is, 35.3%. On the other hand, when the zinc sulfate solution that was subjected to conditioning under the condition that the ORP was 0 mV (vs. Ag/AgCl) or less was used, the iron content was 45.4%, and it was possible to obtain hematite containing a small amount of jarosite. Under the condition that the ORP was −100 mV (vs. Ag/AgCl) or less, it was possible to obtain hematite having iron content of 52% or more.

Example 2

In Example 2, the iron precipitation reaction efficiency depending on the reaction temperature was observed in a temperature range of 120° C. or higher using a zinc sulfate solution containing 145 g/l of zinc under a pressure of 7 barg. The iron precipitation reaction in Example 2 was carried out without inputting hematite seeds.

The ORP was adjusted to −400 mV (vs. Ag/AgCl) using zinc powder as a reducing agent, a zinc sulfate solution having a zinc concentration of 145 g/l, an iron concentration of 12.4 g/l, and a pH of 4.5 was input to an autoclave, a reaction was performed for 2 hours in the state where the reaction temperature was adjusted to 120° C. to 160° C. at a pressure of 7 barg, and then the temperature was reduced to room temperature. The post-reaction solution containing hematite was subjected to solid-liquid separation using a vacuum filtration apparatus and the iron content in the iron precipitate was quantitatively analyzed using an ICP-AES spectroscopy.

TABLE 2

|  | | Comparative Example 3 | Comparative Example 4 | Inventive Example 4 | Inventive Example 5 | Inventive Example 6 | Comparative Example 5 |
|---|---|---|---|---|---|---|---|
| Temperature (° C.) | | 120 | 130 | 135 | 140 | 150 | 160 |
| Post-Reaction Solution | Iron (g/l) | 2.1 | 1.6 | 0.7 | 0.5 | 0.4 | 0.4 |
| | Sulfuric acid (g/l) | 14.3 | 19.2 | 20.9 | 21.2 | 21.5 | 21.5 |
| Iron in precipitate (%) | | 38.7 | 45.3 | 55.7 | 56.6 | 57.7 | 58.4 |
| Iron precipitation rate (%) | | 83.1 | 87.1 | 94.4 | 96.0 | 96.8 | 96.8 |
| Production of Jarosite | | ○ | Δ | X | X | X | X |
| Production of ZSM | | X | X | X | X | X | ○ |

Table 2 shows iron precipitation behavior depending on a reaction temperature according to Example 2.

Figure 2:
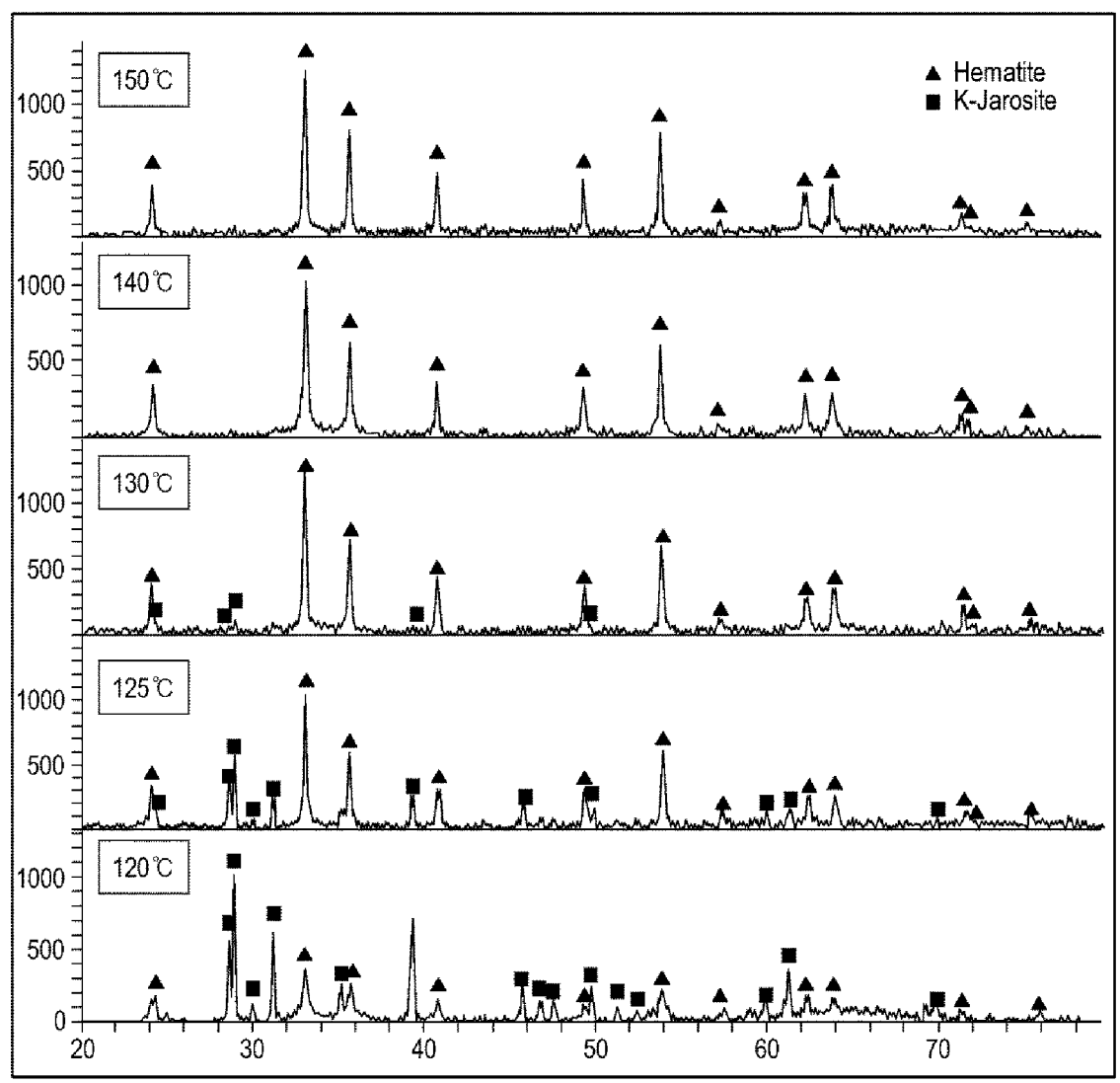
FIG. 2 is a graph representing spectra resulting from X-ray diffraction spectroscopy (XRD) of an iron precipitate according to a reaction temperature.

Referring to Table 2 and FIG. 2, iron was precipitated in the form of yellowish-brown powder at 120° C., and the crystal structure of the obtained precipitate was analyzed using an X-ray diffraction spectroscopy (XRD). As a result, it was observed that jarosite was formed. At 130° C., most iron was precipitated as hematite, but in a form in which jarosite is contained together with the hematite. At a temperature higher than 135° C., hematite having iron content of 55% or more was obtained irrespective of the reaction temperature.

Figure 3:
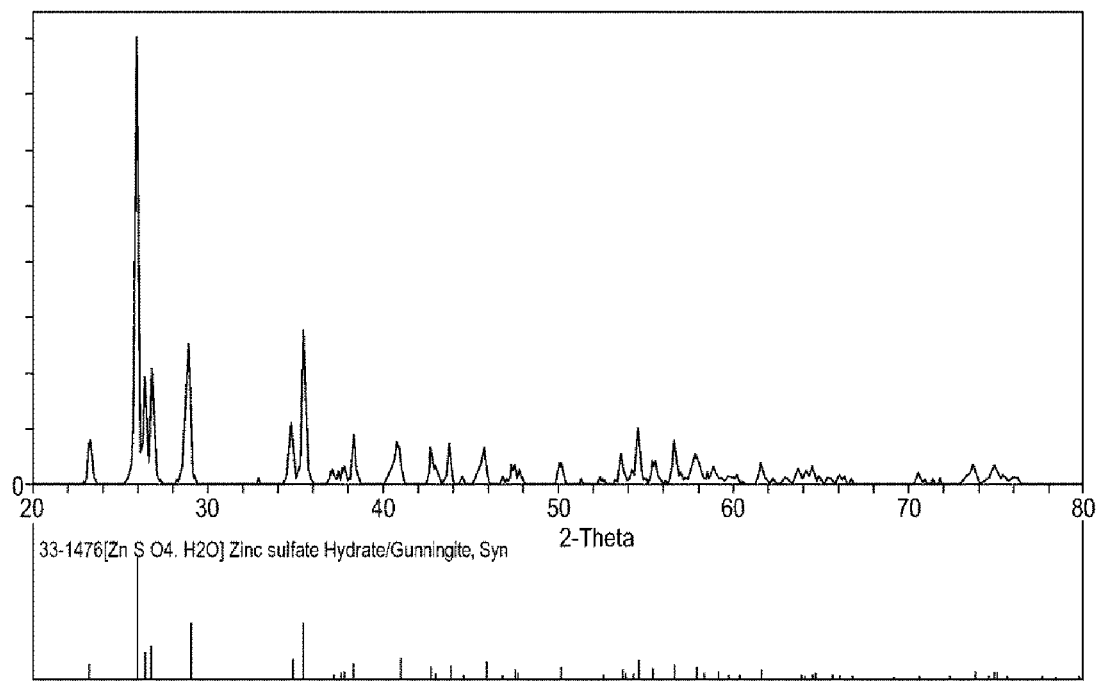
FIG. 3 is a graph representing spectrum resulting from X-ray diffraction spectroscopy of a material produced and adhering to a reactor wall.

However, at 160° C., the solubility of zinc sulfate contained in the reaction solution was significantly lowered, and a supersaturated zinc component was precipitated and adhered to the inner wall and the bottom of the autoclave. The crystals of precipitated precipitate were observed using an X-ray diffraction spectroscopy, and as a result, it was observed that the precipitate was Zinc Sulfate Monohydrate (ZSM, $ZnSO_4H_2O$) as shown in FIG. 3. The precipitated ZSM may adhere to the inside of pipes and apparatus, which may lower apparatus throughput.

Therefore, when the zinc concentration in the zinc sulfate solution was 145 g/l, it was possible to precipitate and recover the iron in the zinc sulfate solution in the form of hematite when the temperature was 135° C. or higher under a pressure of 7 barg.

Example 3

The ORP was adjusted to −400 mV (vs. Ag/AgCl) using zinc powder as a reducing agent, a zinc sulfate solution having a zinc concentration of 145 g/l, an iron concentration of 12.4 g/l, and a pH of 4.5 was input to an autoclave, and the reaction was performed for 2 hours in the state in which the pressure was adjusted to 5 barg to 15 barg by inputting oxygen at a temperature of 145° C., after which the temperature was cooled to room temperature. The iron precipitation reaction in Example 3 was carried out without inputting hematite seeds.

TABLE 3

|  | | Comparative Example 6 | Inventive Example 7 | Inventive Example 8 | Inventive Example 9 | Inventive Example 10 | Inventive Example 11 |
|---|---|---|---|---|---|---|---|
| Pressure | | 3 barg | 5 barg | 7 barg | 8 barg | 10 barg | 15 barg |
| Post-Reaction Solution | Iron (g/l) | 3.5 | 1.2 | 0.5 | 0.5 | 0.4 | 0.4 |
| | Sulfuric acid (g/l) | 17.1 | 21.2 | 21.2 | 21.5 | 22.1 | 22.3 |
| Iron in precipitate (%) | | 49.2 | 50.1 | 56.6 | 56.9 | 57.2 | 58.2 |
| Iron precipitation rate (%) | | 71.8 | 90.3 | 96.0 | 96.1 | 96.8 | 97.1 |
| Production of Jarosite | | X | X | X | X | X | X |
| Production of ZSM | | X | X | X | X | X | X |

Table 3 relates to iron precipitation behavior depending on a pressure according to Example 3.

Referring to Table 3, hematite having an iron content of 50% or more in the iron precipitate was obtained at a pressure of 5 barg or more.

In the disclosures of Examples 1 to 3, the iron precipitation process was carried out in the state in which no hematite seed was input. It was observed that hematite is formed at a relatively low process temperature (ranging from about 135° C. to 150° C.) and pressure (ranging from about 5 barg to 10 barg) even if no hematite seed was input.

Figure 4:
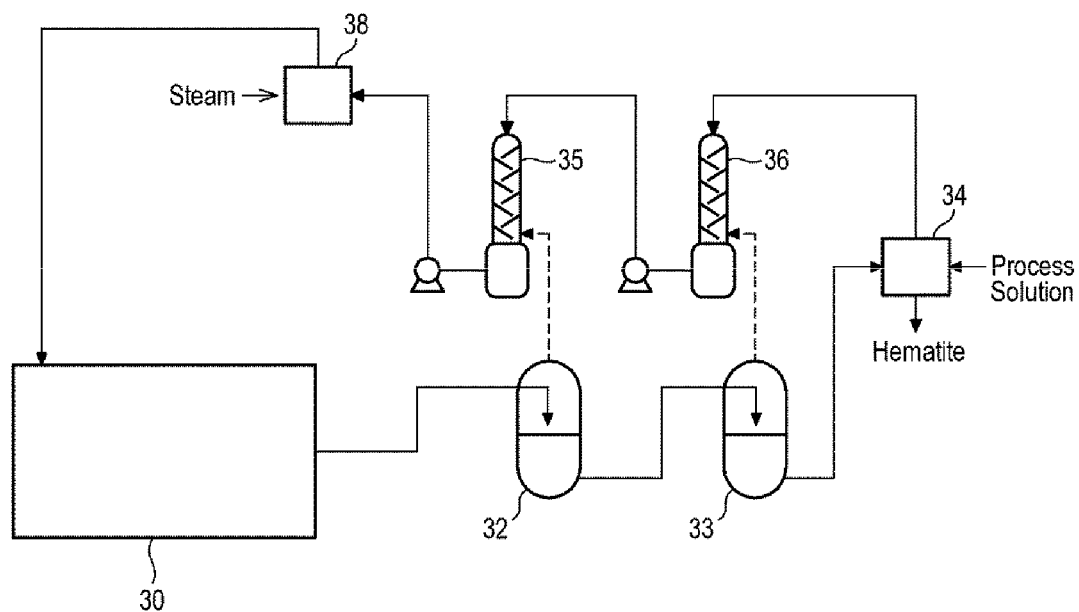
FIG. 4 is an installation diagram of an autoclave apparatus according to an embodiment of the present disclosure.

FIG. 4 is an installation diagram of an autoclave apparatus according to an embodiment of the present disclosure.

Referring to FIG. 4, an autoclave apparatus includes an autoclave 30 configured to input oxygen thereto to oxidize Fe (II) contained in a zinc sulfate solution so as to produce hematite, first and second flash vessels 32 and 33 configured to decompress a high-pressure reaction solution discharged from the autoclave 30 to atmospheric pressure, and a cooler 34 configured to cool the decompressed zinc sulfate solution having a temperature of about 100° C. decompressed at the flash vessels such that the decompressed zinc sulfate solution can be filtered using a filter press.

The process solution is primarily heated serving as a heat exchange solution of the cooler 34 and is then heated by first and second flash vessels 32 and 33 using steam recovered in the first and second heaters 35 and 36. Thereafter, the process solution is heated to a final reaction temperature in a heat exchanger 38 configured to exchange heat using steam, and is then input to the autoclave 30.

In the present embodiment, the flash vessel is configured to be divided into the first flash vessel 32 and the second flash vessel 33 in order to improve thermal efficiency to thus improve the steam recovery rate when the process solution is heated by the steam generated in the flash vessel. At this time, it is possible for the generated steam to minimize energy loss by directly heating the process solution using the first heater 35 and the second heater 36, which are respectively connected to the first flash vessel 32 and to the second flash vessel 33. As described above, in the present embodiment, by inputting the process solution into the autoclave via three heating steps, it is possible to recover 90% or more of the energy of the process solution discharged from the autoclave, and thus it is possible to reduce the amount of steam used for maintaining the reaction temperature at a high temperature by 80% or more.

According to the present disclosure, compared to the related art, the amount of energy consumed for producing hematite can be reduced by recovering iron in the form of hematite under conditions of low temperature and low pressure.

Further, according to the present disclosure, compared to the related art, the zinc concentration in a process input solution can be increased, and by keeping the zinc concentration in the process input solution higher than in the related art, the apparatuses for the zinc process can be reduced and operating costs can be reduced by facilitating the apparatus operation.

Further, according to the present disclosure, since, compared to the related art, an additional apparatus for increasing pressure is not required and the capacity of the decompressing apparatus for lowering the pressure in the post-iron precipitation process can be reduced, the operation cost can be reduced.

In the case of jarosite, the content of iron in the precipitate generated in the zinc process is as low as 30 to 40%, which makes it difficult to use the jarosite as a product, and in the case of goethite, the content of zinc in the precipitate is as high as 8 to 13%. Thus, an additional process for recovering zinc is required. However, according to the present disclosure, it is possible to recover iron as hematite having excellent quality (that is, having a high iron content and a low zinc content) under low-temperature and low-pressure conditions. Therefore, according to the present disclosure, iron, which is a byproduct of the zinc process, can be recovered in the form of highly marketable hematite and thus it is possible to secure economic feasibility by selling the hematite to steel industry as a raw material substituting for iron ore and selling the hematite to cement industry as an iron-added material.

In addition, by using heat emitted from the flash vessel and the cooler in the process of heating the iron precipitation process input solution (autoclave feed solution), it is possible to recover 90% or more of the energy of the process solution discharged from the autoclave, and thus it is possible to save 80% or more of the steam used for maintaining the reaction temperature at a high temperature.

In addition, by configuring the flash vessel in two stages and adjusting the temperature and pressure of each flash vessel, it is possible to improve the recovery rate of steam or the like. By directly heating the process solution in the heater using the steam generated in the flash vessel, it is possible to reduce energy loss and to dilute the zinc sulfate solution input to the autoclave.

While the present disclosure has been described in connection with some embodiments thereof, it shall be understood that various modifications and variations can be made without departing from the spirit and scope of the present disclosure, which may be apparent to a person ordinarily skilled in the art to which the present disclosure belongs. It shall also be understood that such modifications and variations belong to the scope of the claims appended hereto.

What is claimed is:

1. A method of recovering iron from a zinc sulfate solution produced by a leaching process in which zinc ore is dissolved in sulfuric acid, the method comprising:
   conditioning a conditioning process input solution, which is the zinc sulfate solution, including controlling oxidation-reduction potential of the conditioning process input solution,
      wherein the controlling produces a post-conditioning process solution; and
   precipitating iron for recovering iron as hematite, including pressurizing and oxidizing an iron precipitation process input solution,
      wherein the precipitating is performed at a temperature ranging from 135° C. to 150° C. and a pressure ranging from 5 barg to 10 barg,
      wherein the post-conditioning process solution is used as the iron precipitation process input solution, and
      wherein the iron precipitation process input solution has an oxidation-reduction potential of −100 mV or less as measured using a silver/silver chloride (Ag/AgCl) electrode as a reference electrode.

2. The method of claim 1, wherein a post-iron precipitation process solution is produced in the pressurizing and oxidizing the iron precipitation process input solution, the method further comprising:
   treating the post-iron precipitation process solution using a thickener and a filter,
      wherein a discharged solution from the treating the post-iron precipitation process solution is transferred to a neutralization process, and solid matter resulting from the treating the post-iron precipitation process solution is discharged as iron oxide.

3. The method of claim 1, wherein the iron precipitation process input solution has a pH ranging from 3 to 5.5.

4. The method of claim 1, wherein the iron precipitation process input solution has a zinc concentration ranging from 120 g/l to 150 g/l.

5. The method of claim 1, wherein the iron precipitation process input solution has an iron concentration ranging from 5 g/l to 20 g/l.

6. The method of claim 1, wherein a processing time of the iron precipitation process ranges from 30 minutes to 3 hours.

7. The method of claim 1, wherein oxygen and steam are input in the pressurizing and oxidizing of the iron precipitation process input solution.

8. The method of claim 1, wherein an autoclave is used in the pressurizing and oxidizing of the iron precipitation process input solution.

9. The method of claim 1, wherein the pressurizing and oxidizing of the iron precipitation process input solution is performed in an autoclave apparatus, and
wherein the autoclave apparatus includes:
an autoclave;
a flash vessel to which a process solution is supplied from the autoclave;
a heater configured to heat the process solution using steam generated from the flash vessel; and
a heat exchanger configured to perform heat exchange using steam until a final reaction temperature of the process solution is reached.

10. The method of claim 9, wherein the flash vessel is provided in plural number.

11. A method of recovering iron from a zinc sulfate solution produced by a leaching process in which zinc ore is dissolved in sulfuric acid, the method comprising:
conditioning a conditioning process input solution, which is the zinc sulfate solution, including controlling oxidation-reduction potential of the conditioning process input solution, wherein the controlling produces a post-conditioning process solution, treating the post-conditioning process solution using a thickener and a filter, wherein a discharged solution from the treating the post-conditioning process solution is used as the iron precipitation process input solution, and solid matter resulting from the treating the post-conditioning process solution is discharged as conditioning cake; and precipitating iron for recovering iron as hematite, including pressurizing and oxidizing an iron precipitation process input solution,
wherein the precipitating is performed at a temperature ranging from 135° C. to 150° C. and a pressure ranging from 5 barg to 10 barg, and
wherein the iron precipitation process input solution has an oxidation-reduction potential of −100 mV or less as measured using a silver/silver chloride (Ag/AgCl) electrode as a reference electrode.

* * * * *